(12) United States Patent
Todd

(10) Patent No.: US 6,567,109 B1
(45) Date of Patent: May 20, 2003

(54) AUTOMATIC TARGET ENLARGEMENT FOR SIMPLIFIED SELECTION

(75) Inventor: Stephen James Paul Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 09/584,942

(22) Filed: Jun. 1, 2000

(30) Foreign Application Priority Data

Jul. 16, 1999 (GB) .............................................. 9916599

(51) Int. Cl.⁷ ................................................. G09G 5/00
(52) U.S. Cl. ......................................................... 345/862
(58) Field of Search ................................. 345/812, 754, 345/857, 813–814, 822, 764, 862

(56) References Cited

U.S. PATENT DOCUMENTS

| | | | | |
|---|---|---|---|---|
| 5,398,044 A | * | 3/1995 | Hill | 345/157 |
| 5,736,974 A | * | 4/1998 | Selker | 345/157 |
| 5,757,358 A | | 5/1998 | Osga | |
| 5,786,805 A | | 7/1998 | Barry | |
| 5,786,818 A | * | 7/1998 | Brewer et al. | 345/822 |
| 5,805,165 A | | 9/1998 | Thorne, III et al. | |
| 5,808,601 A | * | 9/1998 | Leah et al. | 345/157 |
| 5,808,604 A | * | 9/1998 | Robin | 345/856 |
| 5,870,079 A | * | 2/1999 | Hennessy | 345/157 |
| 6,049,326 A | * | 4/2000 | Beyda et al. | 345/157 |
| 6,404,439 B1 | * | 6/2002 | Coulombe et al. | 345/502 |

FOREIGN PATENT DOCUMENTS

| | | |
|---|---|---|
| EP | 918277 A2 | 5/1999 |
| WO | WO9609578 | 3/1996 |

* cited by examiner

*Primary Examiner*—Kristine Kincaid
*Assistant Examiner*—Le Nguyen
(74) *Attorney, Agent, or Firm*—F. Chau&Associates, LLP

(57) ABSTRACT

In a graphics system for a graphical user interface in which a plurality of screen objects are displayed, a method of targeting a screen object comprises determining a screen object targeted by a pointer and reading a pointer selection and selecting a targeted scream object. The method being characterized by generating, according to the proximity of the pointer position to a screen object, a weighting associated with each screen object, the weighting being in inverse proportion to the displayed size of the associated screen object; and wherein the determination is adapted to determine the targeted screen object according to the respective weightings associated with the scream objects.

10 Claims, 3 Drawing Sheets

AUTOMATIC TARGET ENLARGEMENT FOR SIMPLIFIED SELECTION

BACKGROUND OF THE INVENTION

1. Field of the Invention

The present invention relates to a graphics system for providing simplified pointer selection of objects.

2. Description of Prior Art

It is a well known problem that it is difficult to select small objects with a mouse or other pointer. This problem arises most often, in a cluttered environment, or in the presence of unexpectedly selectable objects. Examples are CAD and VLSI design systems, where selection can be difficult even for an experienced user. A similar problem arises when selecting a moving target. It can also arise for partially disabled users or users not accustomed to mice, when selecting small or thin objects. An example of a prior art document which attempts to solve this problem is U.S. Pat. No. 5,808,601 which discloses an object attractor mechanism where a pointer is attracted to objects based on a calculated mass for the object.

SUMMARY OF THE INVENTION

The present invention on the other hand provides a graphics system for a graphical user interface in which a plurality of screen objects are displayed comprising: targeting means comprising means for determining a screen object targeted by said pointer; selection means comprising means for reading a pointer selection and means for selecting a targeted screen object; said graphics system being characterized by: said targeting means comprising means for generating, according to the proximity of the pointer position to a screen object, a weighting associated with each screen object, said weighting being in inverse proportion to the displayed size of the associated screen object, and wherein said determining means is adapted to determine said targeted screen object according to the respective weightings associated with said screen objects.

The invention operates by permitting the pointer to select small objects when positioned near but not over an object. In the preferred embodiment, objects are considered to lie within a target area (which will be referred to as an extended target area) larger than the object's visible area. Preferably, the smaller an object, the more the target area extends around the object.

Preferably, as the pointer moves, a weighting is calculated for each screen object. The object with greatest weight, if it is over a predetermined threshold, is taken as the selectable object. The 'weight' metric is defined to decrease with increasing geometric distance between the pointer and an object, and to increase for small target objects.

It will be seen that, while multiple identification of objects can happen with objects that visibly overlap, or where their extended target areas overlap, using the invention, it is possible, where a small object lies inside or on the edge of a larger one, for a pointer positioned over the large one and near but not over the small one to identify and make selectable the small object.

In one embodiment of the present invention a graphics system for a graphical user interface in which a plurality of screen objects are displayed is disclosed. The graphics system includes a targeting means comprising means for determining a screen object targeted by said pointer, and a selection means comprising means for reading a pointer selection and means for selecting a targeted screen object.

The graphics system can be characterized by the targeting means including a means for generating, according to the proximity of the pointer position to a screen object, a weighting associated with each screen object, the weighting being in inverse proportion to the displayed size of the associated screen object, and wherein the determining means is adapted to determine the targeted screen object according to the respective weightings associated with the screen objects.

The targeting means is only responsive to the pointer selection to determine the targeted screen object. The targeting means is responsive to each pointer position movement to determine the targeted screen object and wherein the graphics system is adapted to highlight said targeted screen object.

The determining means is adapted to determine a screen object is targeted only if a maximum object weighting exceeds a pre-determined threshold.

The weighting is limited by a maximum growth factor.

In yet another embodiment of the present invention, a control panel is associated with the graphics system, the control panel is responsive to user interaction, and further, updates of the maximum growth factor.

The graphics system can be embodied in an operating system. An application can include the graphics system, the application is one of a general purpose application or a dedicated application.

In one embodiment of the present invention, a computer program product comprising computer program code stored on a computer readable storage medium for, when executed on a computing device, controlling the targeting of screen objects, the program code comprising the graphical system.

In an alternative embodiment of the present invention, a graphics system is disclosed for a graphical user interface in which screen objects are displayed, and a method of targeting a screen object includes the steps of determining a screen object targeted by said pointer, and reading a pointer selection and selecting a targeted screen object.

The method can be characterized by generating, according to the proximity of the pointer position to a screen object, a weighting associated with each screen object, the weighting is in inverse proportion to the displayed size of the associated screen object, and wherein the determining step is adapted to determine the targeted screen object according to the respective weightings associated with the screen objects.

BRIEF DESCRIPTION OF THE DRAWINGS

Embodiments of the invention will now be described with reference to the accompanying drawings, in which.

DETAILED DESCRIPTION OF PREFERRED EMBODIMENTS

The embodiments of the present invention will be described in object oriented terms, nonetheless, the invention is not limited to this method of programming.

In Microsoft® operating systems such as Windows® 95 a Graphical Device Interface (GDI) is an interface to a graphic system for representing graphical objects and transmitting them to output devices, such as monitors and printers. Another example of a graphics system is X-Window, developed at the Massachusetts Institute of Technology (MIT), and upon which almost all UNIX graphical interfaces, including Motif and OpenLook, are based.

Conventional graphics systems communicate with a pointer driver, for example, a mouse driver, and are informed of any movements of the pointer as well as any button pushes. The graphics system is able to examine all screen controls and to detect which screen control is being targeted so that screen controls can be pre-selected as the pointer moves, for example, to provide roll-over emphasis, and the graphics system is also responsive to a button push, so that a screen object can be selected. It is therefore the graphics system which determines the screen control which is to be selected and which is to respond to a pointer selection.

When a pointer lies within an application window, for example, a CAD drawing or a Freelance presentation, the operation of the application for selecting application controlled screen objects is analogous to the operation of graphics sub-system within the operating system. While some application graphic systems do not implement pre-select, ignoring mouse movements, until a button is pushed, they still include means for examining screen objects and determining which screen object is being pointed at any given time and as such are easily adapted to incorporate the present invention.

The present invention is based on the assumption that a graphics system either at the operating system level for handling operating system screen controls or within an application for handling screen objects can examine screen objects and identify the screen control which is to be selected and which is to respond to a pointer selection.

Table #1 shows a sample function enabling a graphics system according to the invention to apply a weighting to displayed screen objects and to enable the graphics system to then determine the targeted screen object which in turn may be selected or made selectable (where pre-select is provided).

Figure 1:
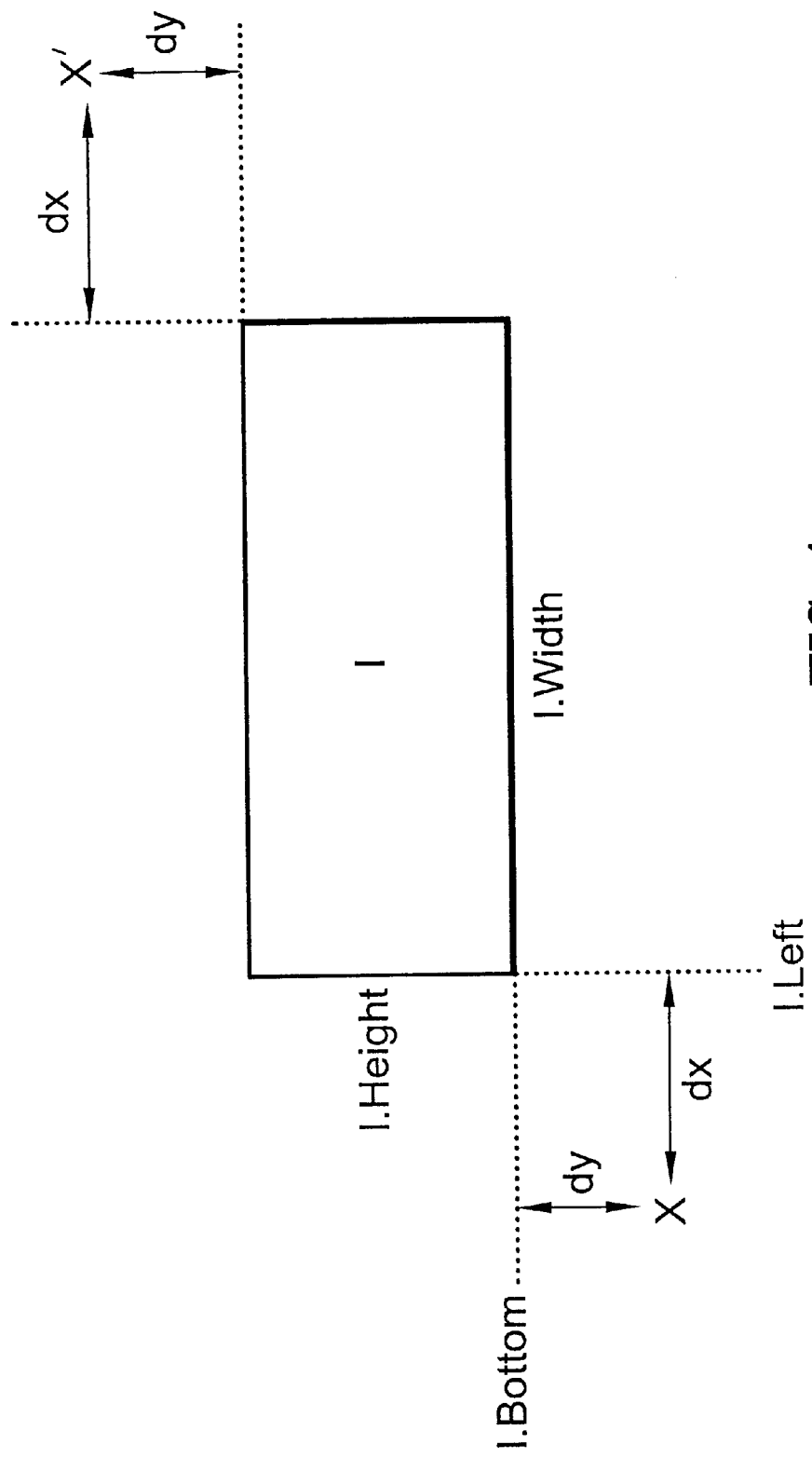
FIG. 1 illustrates the measurements for calculating a weighting for an object according to a first embodiment of the invention.

Referring also to FIG. 1, the function identifies the weight of a target object 1, for a pointer position X. x and y axes are considered independently to make it easy to select thin objects. maximumGrowth is the maximum 'growth' allowed for an object. A constant KK is used to prevent two fairly possible cases of unselectable objects: a small box with 0 sized grab handles where the extended area of the grab handles fully encroach on the box; and narrow characters in text with zero sized selectable inter-character gaps (the gaps encroach on the characters).

The weight is calculated for each dimension and summed. If the sum weight is positive the pointer is within the extended target area of an object.

The growth factor for an individual object is computed to maximize at maximumGrowth, and to fall towards 0 for large objects. KK being less than 1 slows the rate at which the growth factor falls. If the pointer is over the object the growthFactor is taken as the weight, otherwise the weight falls away by distance from the object. Thus at distance "growthFactor" the weight is 0, and beyond that, distance becomes negative.

It will be seen that using this first embodiment, the invention can be best used to select objects which are rectangular in shape and which lie parallel to either the x or y axis.

Figure 2:
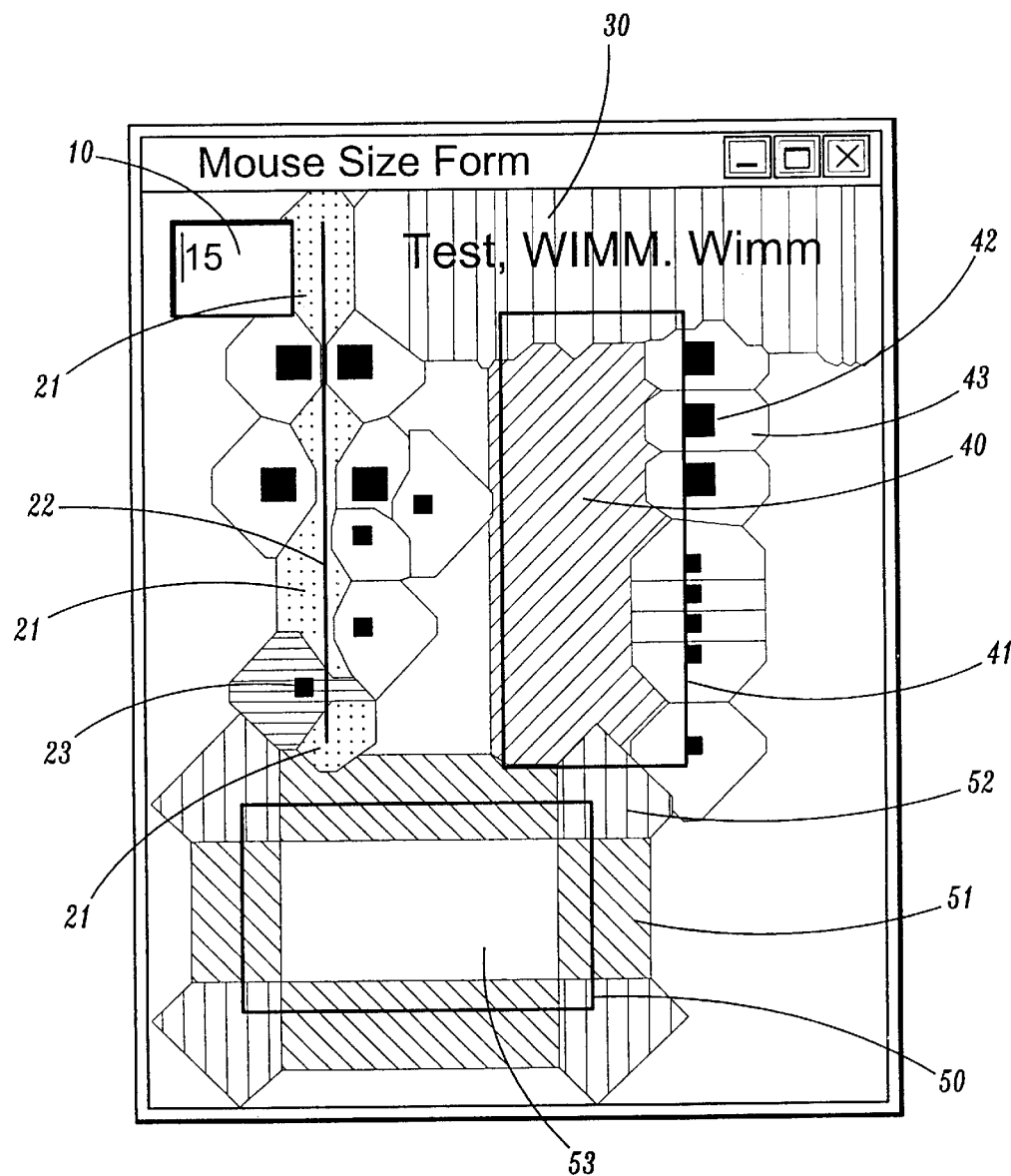
FIG. 2 shows the extended target areas of a number of closely spaced objects.

FIG. 2 illustrates the operation of such an embodiment. As will be seen, some of the boundaries of the extended target areas surrounding objects are quite irregular as the surrounding objects fight for space. In the example, box 10 is used to control and display the maximum growth. This is set rather high in the present example for illustrative purposes.

Extended target area 21 (marked dotted) indicates the selectable area for line 22 surrounded by various small boxes (23 and others). Target area 21 has become divided into three regions as the potential selectable area for object 22 is encroached into by the growth of the small boxes selectable areas.

It can also be seen that because object 23 is relatively small, the extended target area for box 23 (marked with horizontal lines) even spreads to the right hand side of line 22.

A text area 30 shows the division of selectable areas for letters. The vertical spread immediately makes all letters more easily selectable. The exact vertical spread varies according to the neighbouring objects. Nonetheless, it can be seen that, for example, the blank between ',' and 'W' has been considerably widened at the expense of the 'W', but not at the expense of the ','. The 'I' has also become wide as both surrounding characters are wide. The ',' remains fairly narrow. It encroaches a little into the 't'; but as 't' is itself thin the ',' is not allowed to encroach too much.

The invention can also assist the selection of inter-character gaps within text (not illustrated). As above, a text stream is considered as a series of boxes, one per character, each the width of its character. The inter-character gaps may be considered as selectable boxes of zero width (and text height) placed between the characters. The gaps automatically encroach into the characters without completely obliterating their selectability. Changing the value kk in the weight formula (table 1) changes the relative selectable size of the characters and the gaps.

The target area 40 (marked by diagonal stripes) of large box 41 is generally moved left. This is because to the right of box 41 are a variety of small 'ports' (42 and others) whose target areas (43 and others) encroach into the target area 40 of the large box 41. However, the left hand side of the large box 41 lies in an uncluttered region, so the target area 40 spreads to the left of the box. As the box 41 is large, this spread is not very pronounced.

Box 50 represents a box that can be scaled by standard drag handles along the edges and at the corners. Following conventional practice, these handles are not visible until pre-selected when the mouse moves into their target area; or selected after a mouse click. The target areas for the edge handles (51 and others) are marked by diagonal stripes. The target areas for the corner handles (52 and others) are marked by vertical stripes.

In a conventional system, the handles have to be given a precise size. With the present invention, the edge handles have zero width, and the corner handles zero size. Their target areas (51, 52 and others) spread automatically to make the handles easily grabbable. The spread is greater into the screen area outside the box 50 than the spread into the box 50 itself. This is because the weight of box 50 limits the encroachment of target areas of the handles into its target area 53. This automatically ensures that box 50 itself remains easily selectable. A smaller box would limit the internal growth of its grab handles even more.

Figure 3:
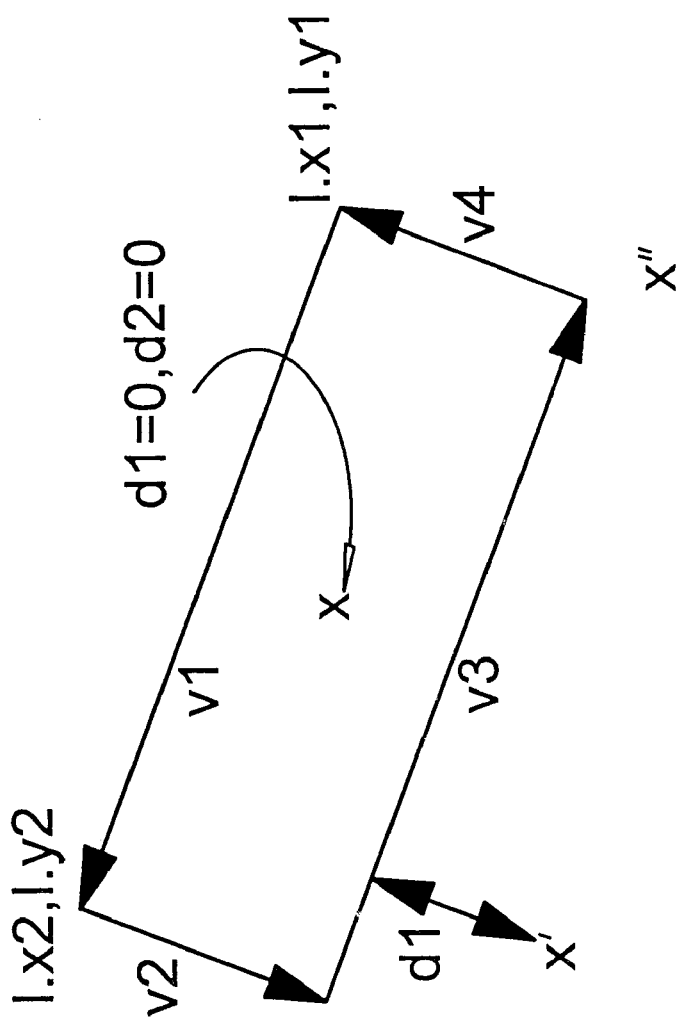
FIG. 3 illustrates the measurements for calculating a weighting for an object according to a second embodiment of the invention.

In an alternative embodiment, FIG. 3, where is it desired to select objects not aligned to the x and y axes, dx and dy are replaced with measurements d1 and d2.

In this embodiment, it is assumed that objects are rectangular or are bounded by a rectangle having vertices v1 ... v4, running anti-clockwise. If a pointer lies within an object, i.e., if the pointer position lies to the left of each of the vertices, then d1 and d2 are 0 and the object has its maximum weighting, e.g., point x. This weighting is of course limited by the size of the object, as smaller objects have larger growth factors.

If the pointer lies to the right of vertex v1 or v3, e.g., point x', then d1 is calculated as the distance from the pointer to the respective vertex. Similarly, if the pointer lies to the right of vertex v2 or v4, then d2 is calculated as the distance from the pointer to the respective vertex. In the case of a pointer position such as x", the object will have both a positive d1 and d2 component, thus diminishing its weight twofold with respect to that pointer position.

The growth factor in the direction of d1 is taken as the distance between v1 and v3 and the growth factor in the direction of d2 is taken as the distance between v2 and v4. Thus, a weight can be calculated in each direction by subtracting d1 and d2 from their respective growth factors, and an overall weight can be calculated by adding these weights as before.

It will be seen that in spite of the present invention, there could be a problem where a large object is nearly covered in small objects. All the small objects may grow to overlap, and leave none of the large object selectable. Some form of special override may be needed for this: for example selection with 'shift' key.

It will be seen that, for best use, the system according to the invention should have pre-select feedback. (The means for providing such feedback are providing anyway by continuously determining the targeted object.) Feedback can be provided, for example, by highlighting a selectable object, or merely indicating status by changing the pointer icon.

It will be seen from the foregoing description that the invention can be implemented within any operating system or general purpose application, for example, within publishing, drawing, presentation, spreadsheet or word processing packages or within dedicated applications, that is anywhere where there is a requirement on the application or operating system to select an object from within a screen display it controls.

Having described preferred embodiments of a method for a graphics system for providing simplified pointer selection of objects, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set for in the appended claims.

TABLE #1

```
KK = 0.33
' find geometric distance in x direction.
If x < 1.Left Then
    dx = 1.Left - x
ElseIf x > 1.Left + 1.Width Then
    dx = x - 1.Left - 1.Width
Else
    dx = 0
End If
' find growth factor based on object size
```

TABLE #1-continued

```
growthFactorX =
(maximumGrowth * maximumGrowth) / (maximumGrowth +
KK*1.Width)
' thus find weight (in this axis)
wx = growthFactorX - dx
'repeat ... for y
...
' find overall weight
1.Weight = wx + wy
```

What is claimed is:

1. A graphics system for a graphical user interface in which a plurality of screen objects are displayed comprising:
   targeting means comprising means for determining a screen object targeted by a pointer;
   selection means comprising means for reading a pointer selection and means for selecting a targeted screen object;
   said graphics system being characterized by;
   said targeting means comprising means for generating, according to the proximity of the pointer position to a screen object, a weighting associated with each screen object, said weighting being in inverse proportion to the displayed size of the associated screen object, and wherein said determining means is adapted to determine said targeted screen object according to the respective weightings associated with said screen objects.

2. The graphics system as claimed in claim 1, wherein the targeting means is only responsive to said pointer selection to determine the targeted screen object.

3. The graphics system as claimed in claim 1, wherein the targeting means is responsive to each pointer position movement to determine the targeted screen object and wherein said graphics system is adapted to highlight said targeted screen object.

4. The graphics system as claimed in claim 1, wherein said determining means is adapted to determine a screen object is targeted only if a maximum object weighting exceeds a pre-determined threshold.

5. The graphics system as claimed in claim 1, wherein said weighting is limited by a maximum growth factor.

6. The graphics system as claimed in claim 5, wherein a control panel is associated with said graphics system, said control panel being responsive to user interaction and to update said maximum growth factor.

7. The graphics system of claim 1, embodied in an operating system.

8. The graphics system of claim 1, wherein an application which includes said graphics system is one of a general purpose application or a dedicated application.

9. A computer program product comprising computer program code stored on a computer readable storage medium for, when executed on a computing device, controlling the targeting of screen objects, the program code comprising the graphical system of claim 1.

10. In a graphics system for a graphical user interface in which a plurality of screen objects are displayed, a method of targeting a screen object comprising the steps of:
    determining a screen object targeted by a pointer;
    reading a pointer selection and selecting a targeted screen object;
    said method being characterized by:
    generating, according to the proximity of the pointer position to a screen object, a weighting associated with each screen object, said weighting being in inverse proportion to the displayed size of the associated screen object; and wherein said determining step is adapted to determine said targeted screen object according to the respective weightings associated with said screen objects.

* * * * *